(12) United States Patent
Kozlowski

(10) Patent No.: US 6,539,105 B1
(45) Date of Patent: Mar. 25, 2003

(54) METHOD TO REDUCE STEPPER MOTOR NOISE WHEN READING CMC7 DOCUMENTS

(75) Inventor: William L. Kozlowski, Novi, MI (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/404,887

(22) Filed: Sep. 24, 1999

(51) Int. Cl.[7] .............................. G06K 9/00; G06K 9/40
(52) U.S. Cl. ....................... 382/139; 382/183; 235/449
(58) Field of Search ........................... 382/139, 137, 382/182–184, 320, 207; 235/449, 375

(56) References Cited

U.S. PATENT DOCUMENTS 4,311,963 A * 1/1982 Watanabe et al. .......... 327/100
5,331,415 A * 7/1994 Hamasaki et al. .......... 348/607
5,367,581 A * 11/1994 Abel et al. .................. 235/449
5,887,075 A * 3/1999 Kruppa ....................... 382/139
5,959,279 A * 9/1999 Komatsu .................... 235/449

* cited by examiner

*Primary Examiner*—Jon Chang
*Assistant Examiner*—Charles Kim
(74) *Attorney, Agent, or Firm*—Harness Dickey & Pierce, P.L.C.; Lise A. Rode; Mark T. Starr

(57) ABSTRACT

A method reduces stepper motor noise in a MICR document waveform resulting from CMC7 information. The method includes the steps of creating a motor noise profile from the document waveform, and creating a working sample waveform from the document waveform. The method further includes the step of applying the motor noise profile to the working sample waveform to reduce stepper motor noise. The method also periodically realigns the motor noise profile with the working sample waveform. Thus, the invention allows reduction of stepper motor noise without requiring relocation of the motor or additional shielding.

8 Claims, 5 Drawing Sheets

US 6,539,105 B1

METHOD TO REDUCE STEPPER MOTOR NOISE WHEN READING CMC7 DOCUMENTS

FIELD OF THE INVENTION

The invention relates to document processing systems. More specifically, the invention concerns the reduction of stepper motor noise when reading CMC7 documents.

BACKGROUND ART

Banks, credit unions and other financial institutions regularly process checks, deposit slips and other types of bank documents in order to execute financial transactions efficiently. Document processing systems have therefore become quite prevalent in the industry. Typically, information will be printed on these documents in magnetic ink which can be read both by the human eye and a computer. This form of printing is read by a process termed magnetic ink character recognition (MICR). As part of the recognition process, a MICR magnetic pickup head is used to read the information printed on the document.

A commonly used font with MICR is CMC7. CMC7 documents are printed like a magnetic barcode with bars spaced at narrow and wide intervals. As characters pass in front of the MICR head, a magnetic signal is produced at the head corresponding to the information contained on the document. When reading these types of documents, the system samples the magnetic signal coming off the head at $\frac{1}{1000}$ of an inch intervals. This forms the basis of the waveform used for reading. This waveform is used to produce a difference waveform by making a second copy of the waveform and delaying it by $\frac{6}{1000}$ of an inch. This distance therefore represents a delay of six samples at the MICR head. The original waveform is then subtracted from the delayed waveform to create a difference waveform. The difference waveform is then used to produce a working sample waveform. A working sample waveform is the current difference sample minus the previous difference sample, and is the waveform used to do the actual recognition. A particular difficulty with present techniques arises from the fact that the working sample waveform at this point contains any motor noise which is present in the document processing system.

Since the MICR head reads magnetic signals, it is very sensitive to outside noise sources. This sensitivity is especially severe in cases of motor noise. If the motor cannot be placed far enough away from the MICR head aperture or shielded adequately, then the electrical noise emanating from the motor will be perceived to be sourced from the document which is being read.

The motor noise which comes from a stepper motor running at a constant speed is periodic in nature. Stepper motors rotate a shaft by energizing magnetic pole pieces. This energizing of the pole pieces causes both positive and negative excursions to the MICR head. These excursions represent the same type of signal produced by the actual document being read. While the noise coming from the motor is periodic in nature, it is not equal in magnitude for every cycle of the motor. This fact makes noise reduction more difficult. It is therefore desirable to take advantage of the periodic nature of stepper motor noise while taking into account cycle magnitude differences. It is also desirable to reduce stepper motor noise when reading CMC7 documents without relocating the motor or providing additional shielding.

SUMMARY OF THE INVENTION

In a first aspect of the invention a method for reducing stepper motor noise in a MICR document waveform includes the steps of creating a motor noise profile from the document waveform, and creating a working sample waveform from the document waveform. The method further includes the step of applying the motor noise profile to the working sample waveform to reduce stepper motor noise. The method also creates the noise profile once per document and periodically realigns the profile with the working sample waveform to take advantage of the periodic nature of the noise.

BRIEF DESCRIPTION OF THE DRAWINGS

The invention is set forth in exemplary fashion by the following detailed description of a preferred embodiment taken in conjunction with the drawings, in which.

DETAILED DESCRIPTION

The invention provides for eliminating unwanted motor noise in document processors reading CMC7 information. By generating a motor noise profile between documents, the method alleviates the need to relocate the stepper motor or add additional shielding. Efficient reduction of noise is also achieved by creating the noise profile no more than once per document. A realignment procedure allows the noise profile to be used repeatedly throughout the document and thereby take advantage of the periodic nature of the noise.

Figure 1:
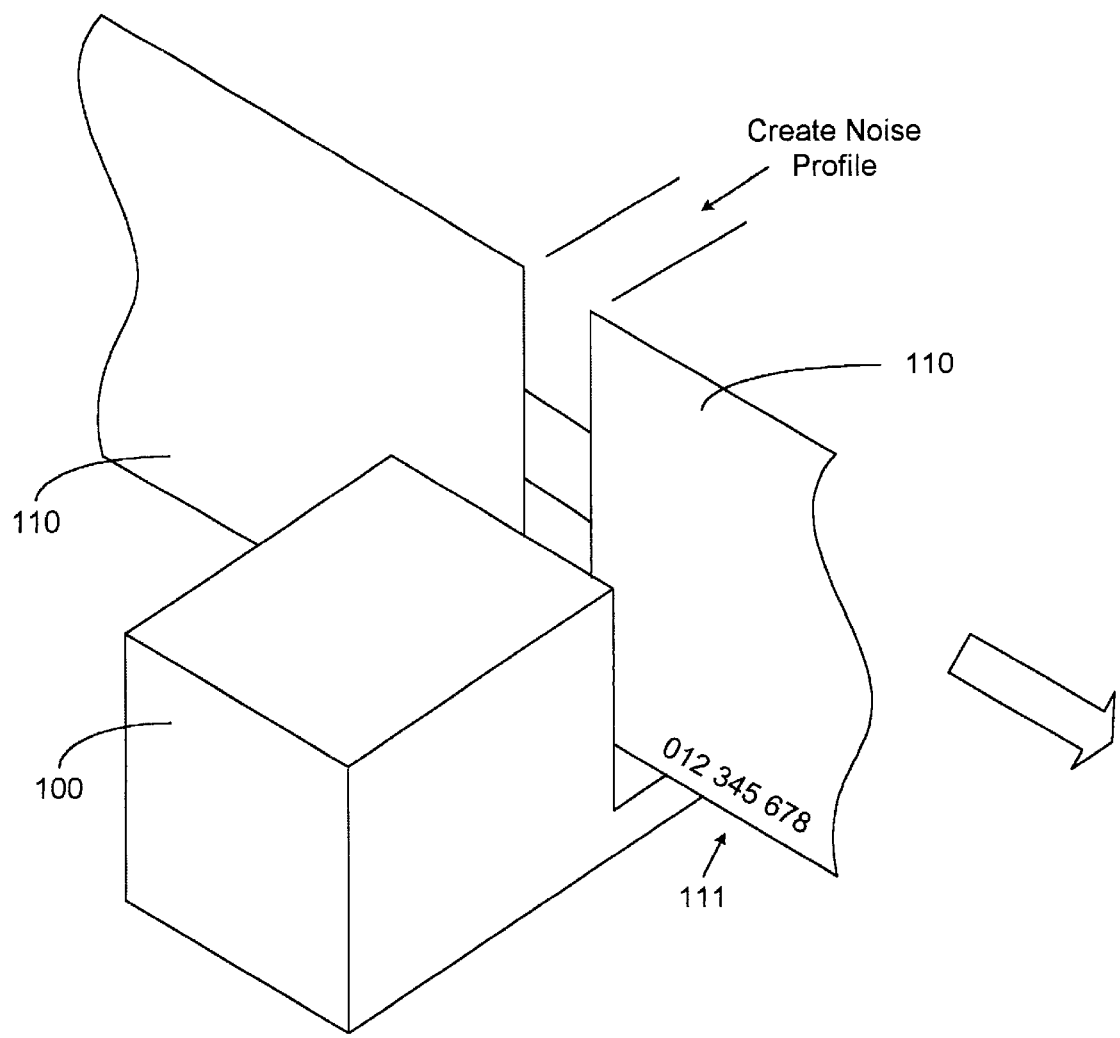
FIG. 1 is an illustration of a document processing system in accordance with the principals of the invention.

Specifically, FIG. 1 illustrates a typical document processing system 100 for reading information printed on MICR documents 110. The information is preferably CMC7 font information 111 which is magnetic based.

Figure 2:
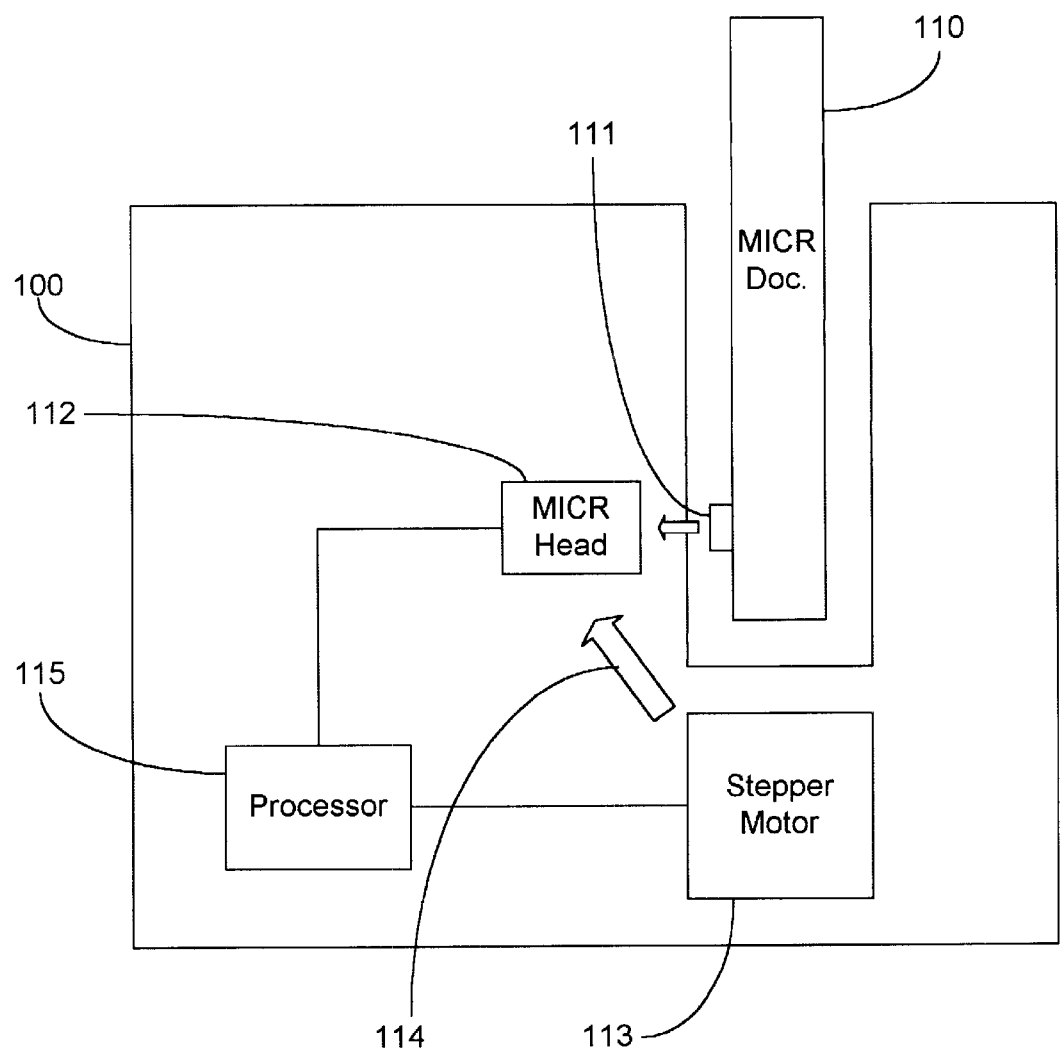
FIG. 2 is a block diagram of a document processing system in accordance with the principals of the invention.

Turning now to FIG. 2, a block diagram of document processing 100 shows implementation of the present invention in greater detail. Document processing system 100 uses a MICR head 112 to magnetically read CMC7 information 111 off of MICR document 110 as stepper motor 113 passes the MICR document 110 through the document processing system 100. Unwanted noise 114 emanates from stepper motor 113 and is perceived by the MICR head 112 to be sourced from MICR document 110 which is being read. Processor 115 approximates this noise 114 and creates a motor noise profile to offset the undesired effects.

Figure 3:
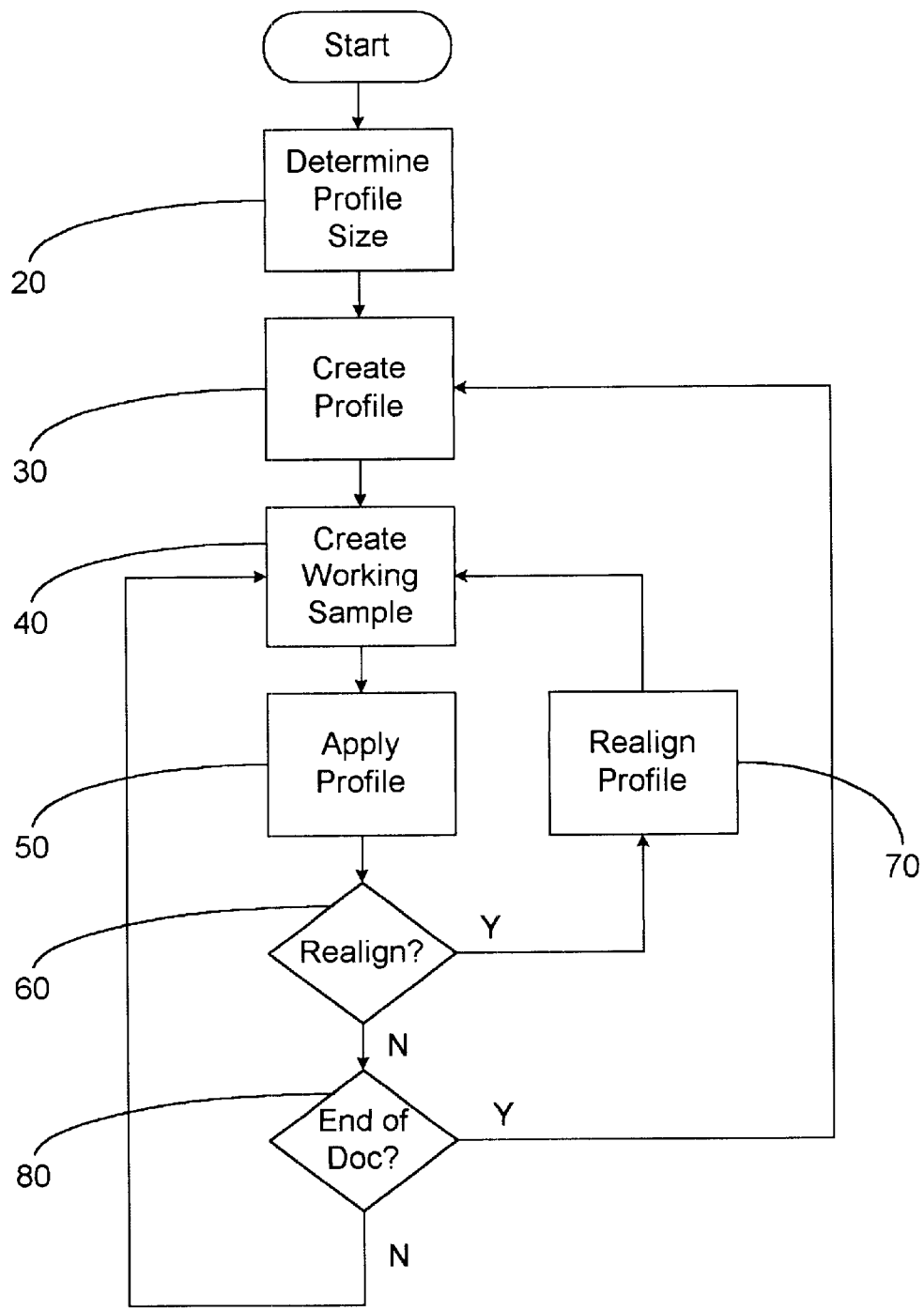
FIG. 3 is a flow chart of a method for reducing stepper motor noise in a MICR document waveform in accordance with the principals of the invention.

Turning now to FIG. 3, a method for reducing stepper motor noise 114 in a MICR document waveform is shown at 10 for programming purposes. This method can be readily implemented in processor 115 using programming techniques currently well known in the art.

Generally, the method 10 is performed by creating a motor noise profile from the document waveform at Steps 20 and 30, and creating a working sample waveform from the document waveform at Step 40. The motor noise profile is then applied to the working sample waveform at Step 50, and the motor noise profile is periodically realigned with the working sample waveform at Steps 60 and 70. More specifically, the motor noise profile is created by first determining a size for the motor noise profile and then obtaining values for the motor noise profile, wherein the profile has a number of values corresponding to the size. Values are essentially data points along the noise profile waveform.

Figure 4:
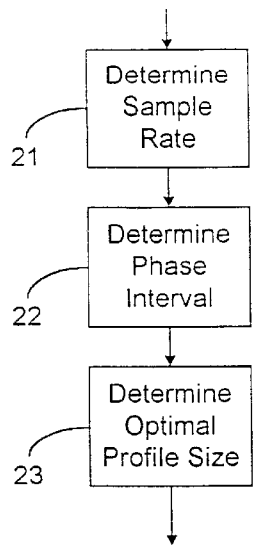
FIG. 4 is a detailed flow chart of a process for determining noise profile size in accordance with the principals of the invention.

Turning now to FIG. 4, the process of determining profile size is shown in greater detail. The sample rate is determined at Step 21. In the preferred embodiment involving CMC7 fonts, samples are taken at a rate of 1000 samples per inch. Using the sample rate and information concerning the stepper motor allows determination of a phase cycle interval. The phase cycle interval represents the number of samples per phase cycle of the motor and is determined at Step 22. For example, a typical stepper motor sampling at a rate of 1000 samples per inch will complete a phase cycle in 37.6 samples. This value represents the phase cycle interval. Using the phase cycle interval and the number of cycles per profile allows determination of an optimal profile size at Step 23. The number of cycles per profile is selected to minimize the mis-match between sampling frequency and motor step frequency. Thus, three cycles per profile will result in 112.8 samples per profile. Since 112.8 samples cannot physically be made, the number of samples per profile will be rounded up to 113. This introduces an error, however, of 0.2 samples for every 113 samples of the document waveform. Note that this error is still less than an error of 0.4 in the case of one cycle per profile based on a phase cycle interval of 37.6. Minimizing the error in the profile size increases performance and efficiency of the overall system.

Figure 5:
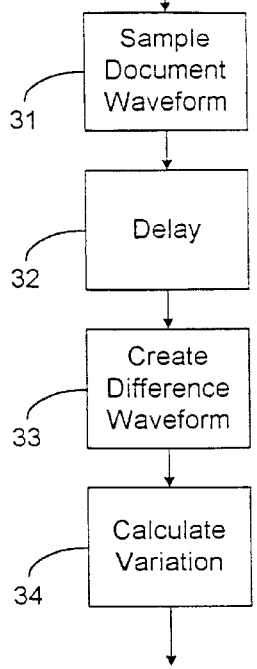
FIG. 5 is a detailed flow chart of a process for creating a noise profile in accordance with the principals of the invention.

Creation of the noise profile and the working sample waveform will now be discussed in greater detail. It is important to note that sampling the document waveform results in the generation of a number of lists to be discussed below. These lists contain values which represent consecutive data points in a given waveform. Turning now to FIG. 5, the process of creating a noise profile is shown in greater detail. The document waveform is sampled at Step 31, and a delayed waveform is created from the document waveform at Step 32. The delayed waveform is offset by six samples. A difference waveform is created from the delayed waveform and the document waveform. The difference waveform represents the difference between the document waveform and the delayed waveform. Thus, a list of deltas is created by subtracting the current sample from the sample $6/1000$ of an inch before it. The equation representing the operation is therefore Delta (I)=MICR sample (I)−MICR sample (I−6). A variation in the difference waveform is then calculated at Step 34, wherein the variation represents values for the motor noise profile. The variation is based on the previous difference value. The variation equation is therefore Motor noise (I)=Delta(I)−Delta(I−1). In the preferred embodiment, the motor noise profile is created during a period between documents to eliminate the need for additional processing.

Figure 6:
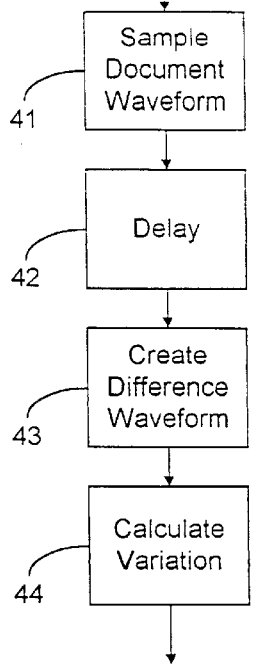
FIG. 6 is a detailed flow chart of a process for creating a working sample in accordance with the principals of the invention.

Creating a working sample waveform at Step 40 is shown in greater detail in FIG. 6. It will be appreciated that creation of the working sample waveform involves the same steps involved in creating the motor noise profile. The primary distinction lies in the content of the document waveform and the period during which the waveform is created. Thus, the document waveform is sampled at Step 41, the delayed waveform is created at Step 42, and the difference waveform is created at Step 43 much in the same way as discussed above. As already noted, a variation in the difference waveform is calculated at Step 44, wherein the variation represents values for the working sample waveform. Terming the working sample waveform as a list of delta differences, the calculation can be described as Delta difference (I)=Delta (I)−Delta (I−1).

Figure 7:
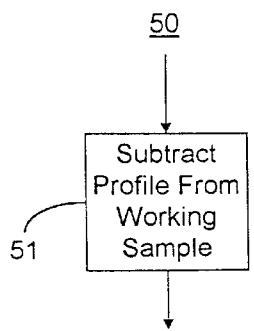
FIG. 7 is a detailed flow chart of a process for applying a noise profile in accordance with the principals of the invention.

Turning now to FIG. 7, the process for applying the motor noise profile is shown in greater detail at 50. Step 51 shows that the noise profile is subtracted from the working sample waveform to reduce the motor noise 114 (see FIG. 2). The calculation is therefore represented by the equation Final MICR values (I)=Delta difference (I)−Motor noise (I).

Figures 8, 9:
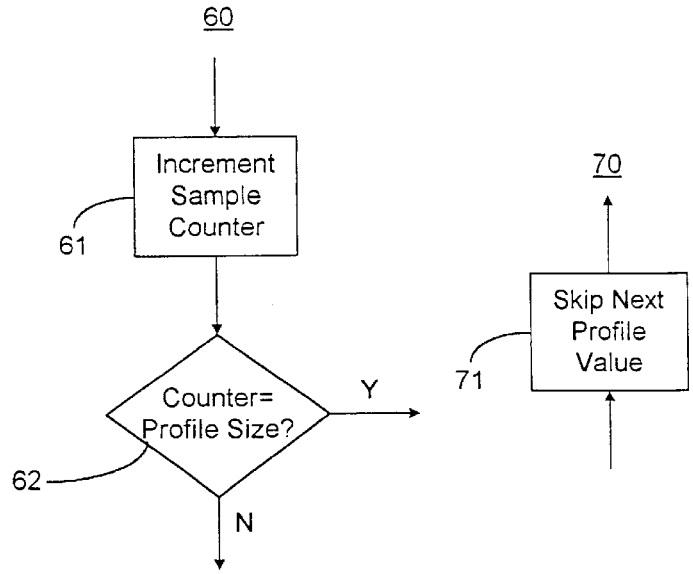
FIG. 8 is a detailed flow chart of a process for determining whether realignment is necessary in accordance with the principals of the invention.
FIG. 9 is a detailed flow chart of a process for periodically realigning the motor noise profile with the working sample waveform in accordance with the principals of the invention.

Steps 60 and 70 demonstrate that the noise profile is repeated at the rate calculated and described in Step 20. FIGS. 8 and 9 show this process in greater detail. A sample counter can be maintained and incremented at Step 61 each time a sample is taken. When the sample counter equals the profile size determined in Step 20, a realignment is necessary and is executed as shown in Step 62. The realignment is performed by skipping the next value in the motor noise profile at Step 71. If the counter has not reached the determined profile size, an end of document check is made at Step 80 to determine whether or not it is time to create a new noise profile (see FIG. 3).

Figure 10:
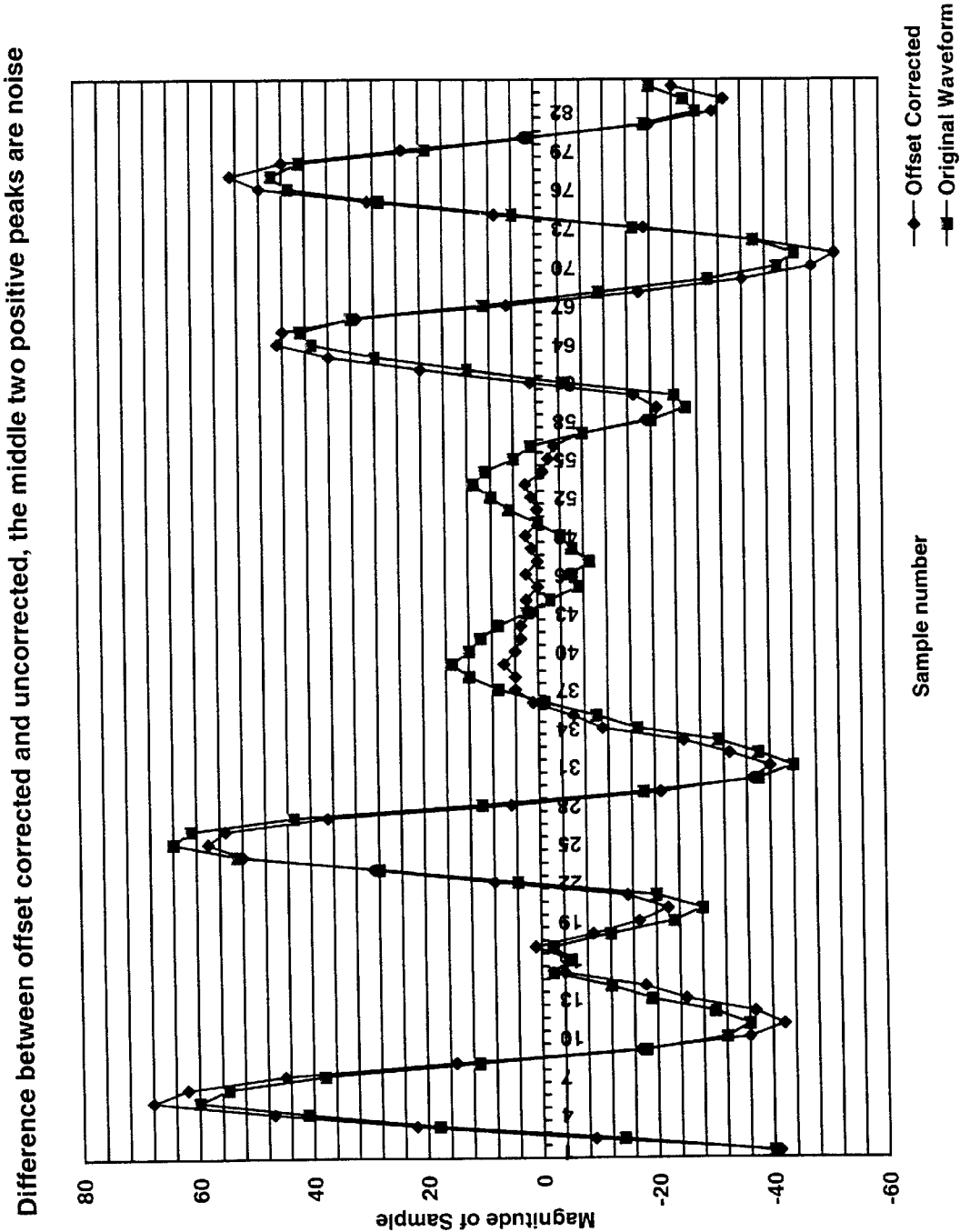
FIG. 10 is a plot of an offset corrected waveform in accordance with the principals of the invention.

Turning now to FIG. 10, an example of an offset corrected waveform is provided. The first two positive peaks are the last two peaks of a character, whereas the next two peaks are due to motor noise between characters. Similarly, the last two positive peaks are again the first two peaks of the next character. Without the motor noise correction, the size of the noise between the characters is equal to over one third of an actual character peak. When motor noise correction is applied, the noise drops to $1/7$ of the character peak. In this case, the signal to noise ratio has more than doubled. The read rate for CMC7 documents can therefore be increased by implementing this motor noise reduction method. The method will not increase the cost of the mechanical system or change the motor placement. It can be implemented with very minimal system resources which normally would not require changes to the system processing power.

The invention has been described with reference to a detailed description of a preferred embodiment for the sake of example only. The scope of the invention is to be determined by proper interpretation of the appended claims.

What is claimed is:

1. A method for reducing stepper motor noise in a MICR document waveform wherein the stepper motor has a motor step frequency and the MICR document waveform has a sampling rate that is asynchronous with the motor step frequency, the method comprising the steps of:

determining a phase cycle interval for the stepper motor based on the motor step frequency and the sampling rate;

selecting a motor noise profile size based on the phase cycle interval so as to reduce the sampling error introduced by sampling asynchronously;

creating a motor noise profile of the motor noise profile size by sampling the document waveform;

creating a working sample waveform by sampling the document waveform;

applying the motor noise profile to the working sample waveform; and periodically realigning the motor noise profile with the working sample waveform.

2. The method of claim 1 further comprising the steps of:

creating a delayed waveform from the document waveform;

creating a difference waveform from the delayed waveform and the document waveform, the difference waveform representing a difference between the document waveform and the delayed waveform; and calculating a variation in the difference waveform, the variation difference representing the motor noise profile.

3. The method of claim 1 wherein the motor noise profile is created during a period between documents.

4. The method of claim 1 further comprising the steps of:

creating a delayed waveform from the document waveform;

creating a difference waveform from the delayed waveform and the document waveform, the difference waveform representing a difference between the document waveform and the delayed waveform; and calculating a variation in the difference waveform, the variation difference representing the working sample waveform.

5. The method of claim 1 further comprising the steps of:

incrementing a sample counter; and determining whether the sample counter is equal to the profile size.

6. The method of claim 5 further comprising the step of skipping a next value in the motor noise profile when the sample counter is equal to the profile size.

7. A method for determining a stepper motor noise profile size, the method comprising the steps of:

determining a sample rate for a document waveform, the document waveform being sampled from a MICR head, the sample rate being asynchronous with a motor step frequency of the stepper motor;

determining a phase cycle interval from the sample rate and from information concerning the motor; and determining an optimum profile size from the phase interval and a number of cycles per profile, the profile size representing a number of samples per profile resulting in minimal sampling error.

8. The method of claim 7 wherein the document waveform results from MICR ink printed in CMC7 font.

* * * * *